G. SCHOENNER.
DRAWING PEN.
APPLICATION FILED MAY 22, 1914. RENEWED JAN. 19, 1922.

1,412,491.

Patented Apr. 11, 1922.
3 SHEETS—SHEET 1.

Witnesses
Mildred Hellmuth
W. Wallace Navin Jr.

Inventor
Georg Schoenner
By Fowell & Fowell
Attorneys

G. SCHOENNER.
DRAWING PEN.
APPLICATION FILED MAY 22, 1914. RENEWED JAN. 19, 1922.

1,412,491.

Patented Apr. 11, 1922.
3 SHEETS—SHEET 2.

Witnesses
Mildred Hellmuth
W. Wallace Navin Jr.

Inventor
Georg Schoenner
By Sowell & Sowell
Attorneys

G. SCHOENNER.
DRAWING PEN.
APPLICATION FILED MAY 22, 1914. RENEWED JAN. 19, 1922.

1,412,491.

Patented Apr. 11, 1922.

Witnesses
Mildred Hellmuth
W. Wallace Nairn Jr

Inventor
Georg Schoenner
By Howell & Howell
Attorneys

UNITED STATES PATENT OFFICE.

GEORG SCHOENNER, OF NUREMBERG, GERMANY.

DRAWING PEN.

1,412,491. Specification of Letters Patent. Patented Apr. 11, 1922.

Application filed May 22, 1914, Serial No. 840,355. Renewed January 19, 1922. Serial No. 530,491.

*To all whom it may concern:*

Be it known that I, GEORG SCHOENNER, residing at Nuremberg, in the Empire of Germany, have invented certain new and useful Improvements in Drawing Pens, of which the following is a specification.

This invention relates to drawing pens and has for its object to provide a simple and efficient pen of the kind wherein means are provided for maintaining the thickness of the line drawn constant.

In comparison with the numerous already known drawing pens provided with means for keeping the thickness of the line drawn therewith constant, the improved pen is distinguished by its extreme simplicity and by the fact that, during the process of cleaning, unintentional alteration in the thickness of the line is prevented.

For this purpose, in a pen according to the invention the screw threaded adjusting screw is constructed as a locking hook and is associated with a flat guide bar.

Fig. 1 of the accompanying illustrative drawings shows in side elevation the nib portion of one construction of drawing pen embodying the invention.

Figure 1:
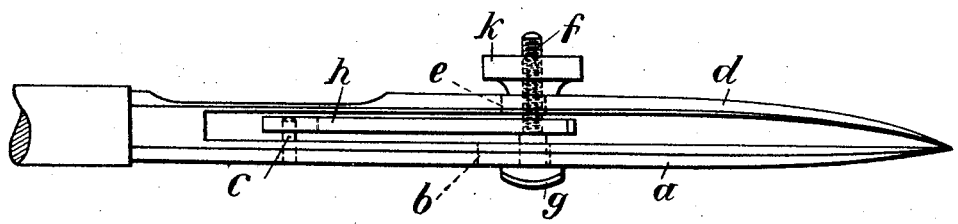
Figure 2:
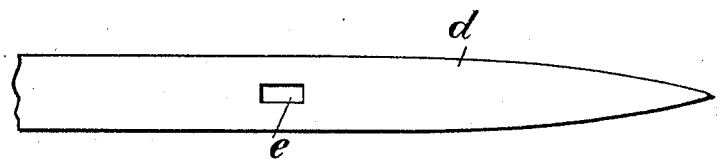
Fig. 2 shows the upper nib of the pen in plan.
Figure 3:
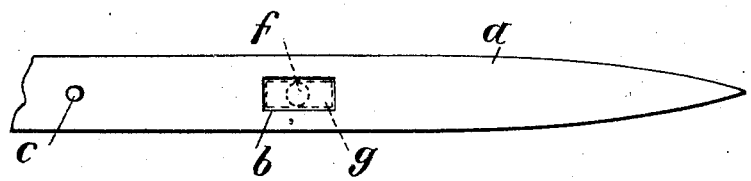
Fig. 3 is an internal plan view of the lower nib of the pen.
Figure 4:
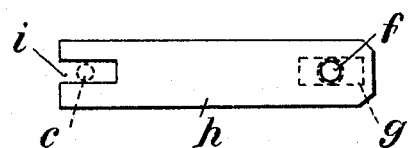
Fig. 4 shows the guide bar in plan.
Figure 5:
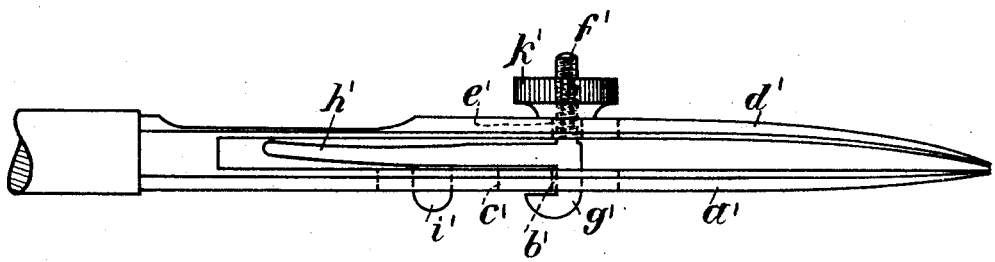
Figs. 5, 6, 7 and 8 are similar views to Figs. 1, 2, 3 and 4 respectively illustrating another construction of the improved pen.
Figure 6:
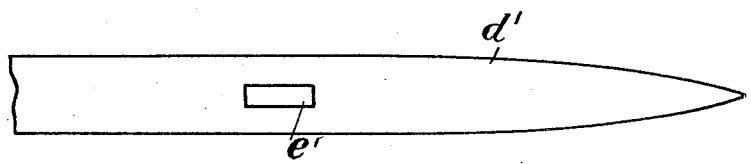
Figure 7:
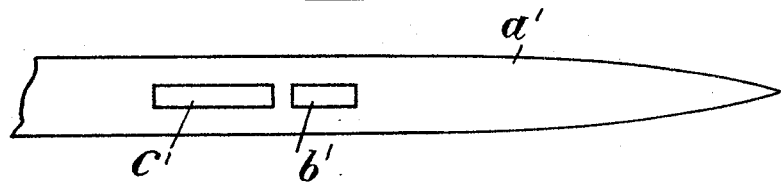
Figure 8:
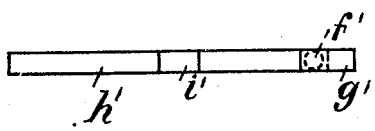

Referring to Figs. 1 to 4, the lower nib $a$ of the pen is formed about midway of its length with a longitudinal slot $b$ and adjacent to the handle it is provided with an inwardly projecting guide pin $c$. The upper nib $d$ of the pen is formed with a longitudinal slot $e$ corresponding to the slot $b$. The set screw $f$ is flattened at its lower end and provided with a hook or extension $g$ which preferably projects in opposite directions from the body of the screw forming a T-shaped head. Rigidly connected to the screw $f$ is a flat guide bar $h$ which at its rear end is formed with a recess $i$ which embraces the guide pin $c$ forkwise. Upon the outwardly protruding end of the screw $f$ is an adjusting nut $k$ in the form of a thumb wheel.

When the nut $k$ is removed the parts are put together in the following manner. The two nibs $a$ and $d$ of the pen are pried apart and the hooked lower end $g$ of the screw $f$ is passed through the longitudinal slot $b$, the forked end of the guide bar $h$ being simultaneously passed over the pin $c$. The nut $k$ is then screwed on and the pen is then complete.

When the pen is ready for use the end of the hook is caught over the front edge of the slot $b$, the pin $c$ preventing any undesired rotation of the screw $f$. The thickness of the line to be drawn with the pen is regulated by the nut $k$ in the usual manner.

In order to clean the drawing pen it is held with the handle end downwards and by means of pressure by the fingers upon the pointed ends of the two nibs $a$ and $b$ the pressure upon the hook $g$ and the under surface of the nut $k$ is released, so that the system of movable parts falls downwards until the screw threaded stem $f$ reaches the rear end of the slot $e$. When the nibs of the pen are released the hooked part $g$ passes freely through the slot $b$ so that the operation of cleaning can be performed.

After the pen has been cleaned the draughtsman holds the pen with the handle end downwards and pinches the pointed ends of the two nibs $a$ and $d$ close together so that the hooked part $g$ passes through the slot $b$. He then turns the drawing pen upside down, still keeping the nibs of the pen pinched together, so that the system of movable parts falls towards the points of the pen and the hooked part $g$ passes into the gripping position.

When released the nibs $a$ and $d$ spring part until the former thickness of line is again attained.

During the operations of opening, cleaning and closing the pen, the nut $k$ does not need to be touched at all, but for this purpose six parts are necessary in the construction under notice, namely the two nibs of the pen, the set screw $f$, the adjusting nut $k$, the guide bar $h$, and the guide pin $c$. In the pens now to be described the draughtsman is enabled to effect the said operation with four parts only.

In the drawing pen shown in Figs. 5, 6, 7 and 8, the hooked screw $f'$, $g'$ is formed in one piece with the guide bar $h'$.

The guide bar $h'$ which is tapered towards its rear end and is made from suitable sheet metal, has on its lower face, in addition to the hook $g'$, a stop lug $i'$, the adjusting screw $f'$ projecting from its upper face opposite to the hook $g'$. The hook $g'$ is adapted to extend through the longitudinal slot $b'$ in the nib $a'$ of the pen. The said nib $a'$ is also formed with a second longitudinal slot $c'$ through which the lug $i'$ is adapted to extend.

The lug $i'$ in conjunction with the slot $c'$ replaces the guide pin $c$ in conjunction with the recess $i$ in the bar $h$ of the pen of Figs. 1 to 4. The manipulation of the pen last described is therefore effected in exactly the same manner as in the previously described arrangements.

Figure 9:
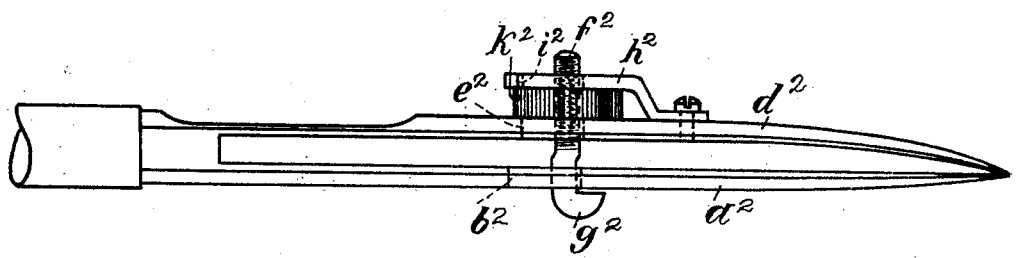
Fig. 9 shows in side elevation and Fig. 10 in plan, a modified construction of pen according to the invention.
Figure 10:
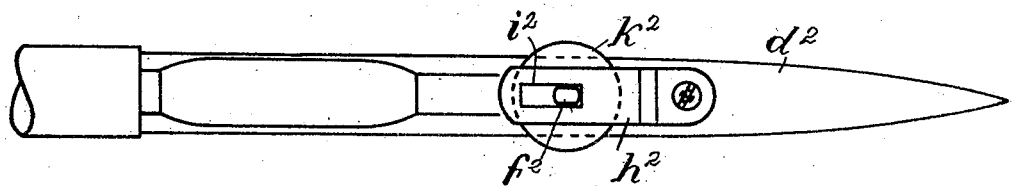
Figure 11:
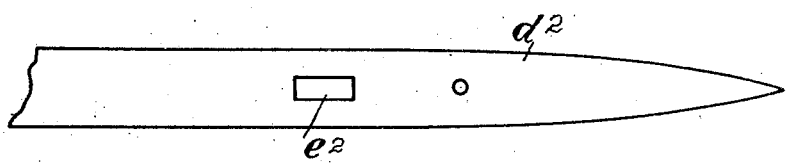
Figs. 11 and 12 are plan views of the upper and lower nib respectively of the pen shown in Figs. 9 and 10.
Figure 12:
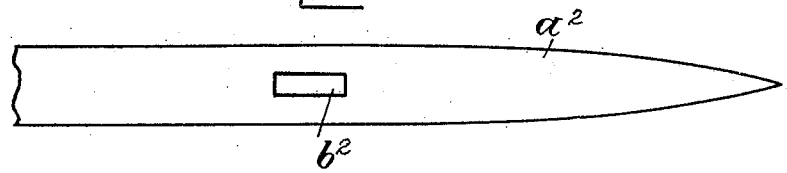

In the pen shown in Figs. 9, 10 and 11, the guide bar $h^2$ is not arranged between the two nibs of the pen. The screw $f^2$ is made in one piece with the hook $g^2$, and is flattened in part by removing the screw thread on both sides, see Fig. 10. The end of the screw $f^2$ projecting upwardly beyond the adjusting nut $k^2$ extends through a longitudinal slot $i^2$ in a guide bar $h^2$ which is shaped as shown and one end of which is screwed to the upper nib $d^2$ of the pen. The adjusting nut $k^2$ is constructed in the form of a flat disc and is held between the slotted part of the guide member $h^2$ and the nib $d^2$ by friction, so that it does not change its position contrary to the draughtsman's intention if the pen is accidentally knocked.

The friction produced influences the action in so far that it is not possible, by simply pinching the nibs of the pen together, to render the hooked portion sufficiently movable as to render it capable of falling by its own weight so that it is necessary to apply pressure with the fingers either upon the hooked part $g^2$ or upon the upper end of the screw $f^2$. Even in this case however the adjusting nut is not touched and consequently the hereinbefore mentioned advantages are still attained.

What I claim is:—

1. In an oblong drawing pen, two nibs each having a slot therein, an adjusting screw extending through said slots, a head on said screw engaging the edge of the slot in one of said nibs, a guide bar fixed to said screw, and means for holding said bar in fixed position.

2. In a drawing pen, two nibs each formed with a slot, an adjusting screw extending through the slots of said nibs, a head on said screw engaging the edge of the slot in one of said nibs, a pin on one of said nibs, a slotted guide bar fixed to said screw and sliding on said pin, and an adjusting nut on said screw.

3. In a drawing pen, two nibs each formed with a slot, an adjusting screw extending through the slots of said nibs, a head on said screw engaging the edge of the slot in one of said nibs, a pin projecting from one of said nibs between the said nibs, a slotted guide bar located between said nibs said bar being fixed on said screw and sliding on said pin, and an adjusting nut on said screw.

4. In a drawing pen, two nibs each formed with a slot, an adjusting screw extending through said slots and having a head arranged to catch over one edge of the slot in one of said nibs, a guide member fixed on said screw having a recess therein, a pin on one of said nibs engaging said recess, and an adjusting nut on said screw.

5. In a drawing pen, two nibs each formed with a slot, an adjusting screw extending through the slots of said nibs, a head on said screw engaging the edge of the slot in one of said nibs, a slotted guide member fixed to said screw, a pin on one of said nibs engaging the slot in said guide member, and an adjusting nut on said screw.

6. In an oblong drawing pen, two nibs each formed with a slot, an adjusting screw extending through the slots of said nibs, a head on said screw engaging the edge of the slot in one of said nibs, a guide member fixed to said screw and located between said nibs, and an adjusting nut on said screw.

7. In a drawing pen, two nibs each formed with a slot, an adjusting screw extending through the slots of said nibs, a head on said screw engaging the edge of the slot in one of said nibs, a slidable guide member carried by said screw, and a part fixed to one of said nibs on which said guide member can slide.

In testimony whereof I affix my signature in presence of two witnesses.

GEORG SCHOENNER.

Witnesses:
LEONHARD KOERBER,
FRITZ RENZ.